United States Patent
Rodriguez

Patent Number: 5,864,924
Date of Patent: Feb. 2, 1999

[54] EYEGLASS HOLDER

[76] Inventor: Luis Rodriguez, 8008 Cascadas Ave., North Port, Fla. 34287-1636

[21] Appl. No.: 934,181

[22] Filed: Sep. 19, 1997

Related U.S. Application Data

[63] Continuation-in-part of Ser. No. 783,188, Jan. 15, 1997, abandoned.

[51] Int. Cl.$^6$ .............................. A44B 21/00; A45C 11/00
[52] U.S. Cl. .................................. 24/3.3; 24/3.1; 24/3.11; 248/902
[58] Field of Search .............................. 24/3.3, 66.2, 56, 24/570, 563, 3.1, 3.11; 248/902; 351/155, 158

[56] References Cited

U.S. PATENT DOCUMENTS

| | | | |
|---|---|---|---|
| 4,458,384 | 7/1984 | Arnold | 24/3.3 |
| 4,809,406 | 3/1989 | Tsai | 248/902 X |
| 4,930,740 | 6/1990 | Vogt | 24/3.3 X |
| 4,969,239 | 11/1990 | Bruno | 24/3.3 |
| 5,078,484 | 1/1992 | Vaughn . | |
| 5,082,225 | 1/1992 | Nespoli | 248/902 X |
| 5,129,617 | 7/1992 | MacWilliamson | 24/3.3 X |
| 5,178,283 | 1/1993 | Ennis | 248/902 X |
| 5,305,934 | 4/1994 | Grey . | |
| 5,319,838 | 6/1994 | Eppenauer . | |
| 5,351,098 | 9/1994 | McDaniels et al. | 24/3.3 X |
| 5,372,345 | 12/1994 | Schmidt | 248/902 X |
| 5,504,541 | 4/1996 | Ilton et al. | 24/3.3 X |
| 5,551,126 | 9/1996 | Wallo . | |
| 5,619,774 | 4/1997 | Perry | 24/3.3 X |

*Primary Examiner*—Randolph A. Reese
*Assistant Examiner*—Robert J. Sandy
*Attorney, Agent, or Firm*—Charles J. Prescott

[57] ABSTRACT

An eyeglass holder attachable to an article of clothing worn by the user for suspending a pair of eyeglasses. The eyeglasses are suspended facing upwardly and supported by the bridge of the eyeglasses with the temples either open and downwardly extending or folded closed. When open, the temples are supported from substantial movement against the body of the user. A biasingly positionable retaining member holds the bridge from substantial movement as well. One embodiment (preferred) holds the temples in the closed position for better protection thereof.

16 Claims, 4 Drawing Sheets

EYEGLASS HOLDER

This is a continuation-in-part of Ser. No. 08/783,188 filed Jan. 15, 1997 now abandoned.

BACKGROUND OF THE INVENTION

1. Scope of Invention

This invention relates generally to eyeglass holders, and more particularly to an eyeglass holder which will retain the eyeglasses in a particularly orientation without substantial movement with respect to the user.

2. Prior Art

Many people wear eyeglasses and all are challenged with having a convenient and safe place to carry the eyeglasses which is both safe and renders the eyeglasses easily accessible. Even with the advent of very effective and convenient contact lenses, still a great deal of people must rely on conventional eyeglasses. Although manufacturers of eyeglasses typically provide a case for this purpose, the convenience of utilizing a case for both protection and carrying represents more of an inconvenience to the user than the benefits derived therefrom.

A well-known solution for carrying eyeglasses is simply to connect a cord from each distal end of each of the temples or side pieces of the eyeglasses, which cord is draped around the back of the neck to hold the eyeglasses in a downwardly position at the chest area when not in use. However, the eyeglasses when held in the non-use position with these neck cords typically dangle and swing about, increasing the likelihood of damage, excessive abuse and even loss.

A patented device disclosed in U.S. Pat. No. 5,305,934 invented by Grey teaches a combination tool and eyeglass holder which is also hung about the neck by a flexible cord. This device includes a ring for attachment of one of the eyeglass temples inserted therethrough and further includes a horizontally positioned container for holding a small eyeglass screwdriver for adjustments. However, in Grey the eyeglasses are still free to swing or pitch about when not in use, thus not providing much more in the way of eyeglass protection than the previously described neck cord connected to each of the ends of the eyeglass temples.

Vaughn, in U.S. Pat. No. 5,078,484, teaches a lapel pin eyeglass and pillbox combination, but in this device as well, the eyeglasses are held by one of the temples in the folded position and the eyeglasses are again free to dangle and swing about and would appear to be in some jeopardy of being completely disengaged because of the "J" shape of the hook for eyeglass retention.

Another eyeglass holder is disclosed in U.S. Pat. No. 5,319,838 invented by Eppenaur wherein an eyeglass holder may be attached to the user similar to that of a pendant or connected to a necklace worn by the user. This device also presents a horizontal loop into which one temple of the eyeglasses may be inserted for supportive retention. However, once again, the dangling and swinging of the eyeglasses about the single tension support arrangement leaves a great deal to be desired in terms of both protection and stability of the eyeglasses when not in use.

A button-on holder for eyeglasses is taught by Wallo in U.S. Pat. No. 5,551,126 in which a very simple yet unobtrusive eyeglass hanger is disclosed. This eyeglass holder is attached to a button on the front of a shirt or blouse, one stem of the eyeglasses insertable through the bottom portion of the aperture for receiving the button. Although this device perhaps lends a bit more stability to the hanging eyeglasses because they press against the body of the user by the front or back area of the folded eyeglasses, nonetheless dangling and swinging of the stored eyeglasses is likely even with this device.

The present invention overcomes these limitations of unwanted eyeglass movement when in a stored position. With the present invention, very little eyeglass movement, if any, is likely and the eyeglasses are always held in the same position for ease in repeatable and convenient removal and restoring.

BRIEF SUMMARY OF THE INVENTION

This invention is directed to an eyeglass holder attachable to an article of clothing worn by the user for suspending a pair of eyeglasses. The eyeglasses are suspended facing upwardly and supported by the bridge of the eyeglasses with the temples either open and downwardly extending or folded closed. When open, the temples are supported from substantial movement against the body of the user. A biasingly positionable retaining member holds the bridge from substantial movement as well. One embodiment (preferred) holds the temples in the closed position for better protection thereof.

It is therefore an object of this invention to provide an eyeglass holder which will retain the eyeglasses in a substantially stationary position with respect to the user so as to minimize the likelihood of eyeglass damage and annoyance from unnecessary movement.

It is another object of this invention to provide an eyeglass holder which is easily attachable in various ways against the body and/or clothing of the user.

It is yet another object of this invention to provide an eyeglass holder for storing eyeglasses when not in use against the body of the user wherein the eyeglasses may be stored and secured from substantial movement in either a temples open or a temples closed orientation.

It is still another object of this invention to provide a device for holding eyeglasses which is easily adaptable to various eyeglass sizes.

In accordance with these and other objects which will become apparent hereinafter, the instant invention will now be described with reference to the accompanying drawings.

DETAILED DESCRIPTION OF THE INVENTION

Figure 1:
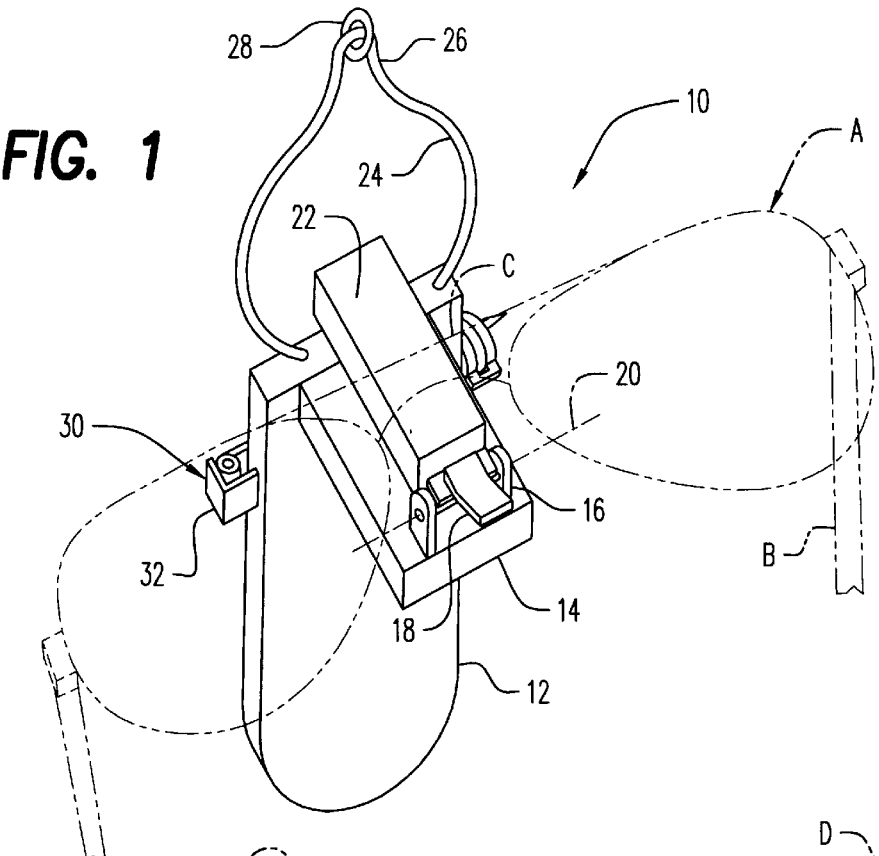
FIG. 1 is a perspective view of one embodiment of the invention shown with a pair of eyeglasses (temples open position) being supported thereby shown in phantom.
Figure 2:
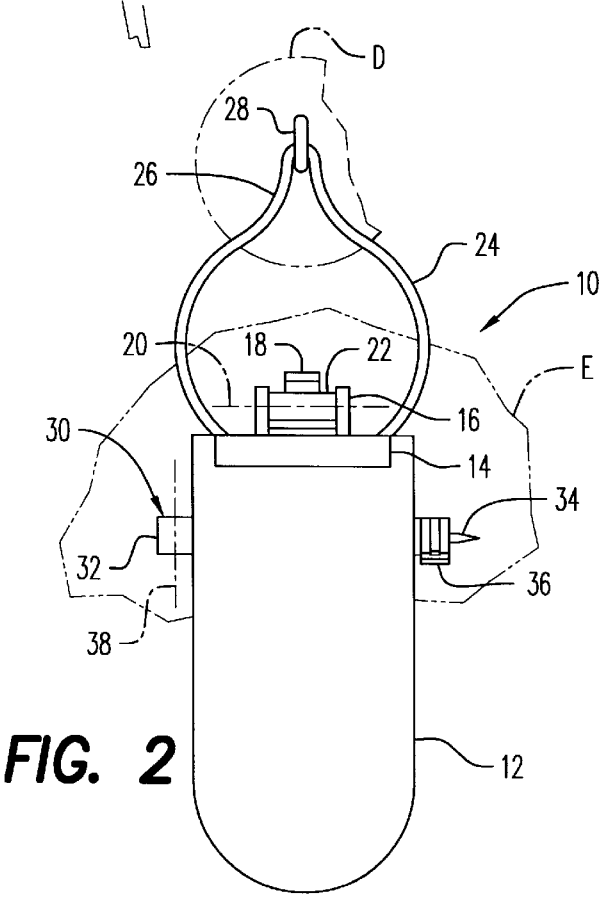
FIG. 2 is a front elevation view of the invention shown in FIG. 1 and showing portions of an upper body garment (in phantom) to which the device is releasibly attached.
Figure 3:
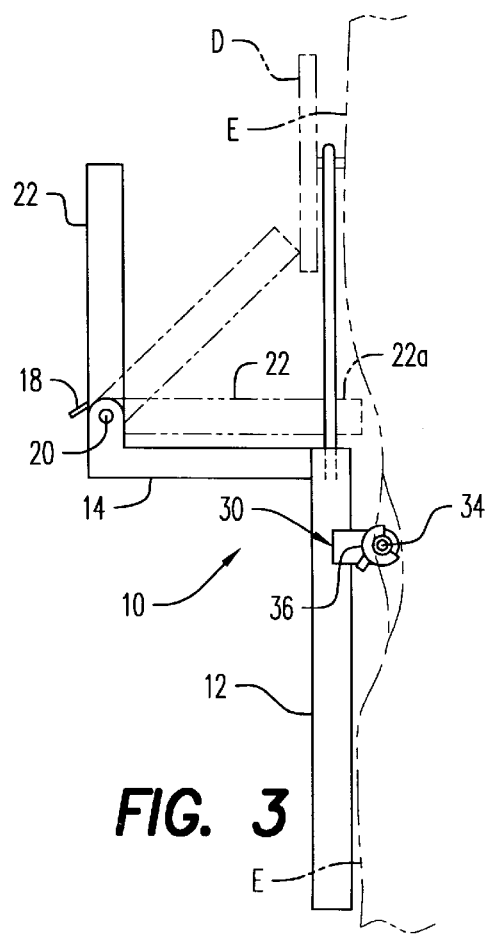
FIG. 3 is a side elevation view of FIG. 2.
Figure 4:
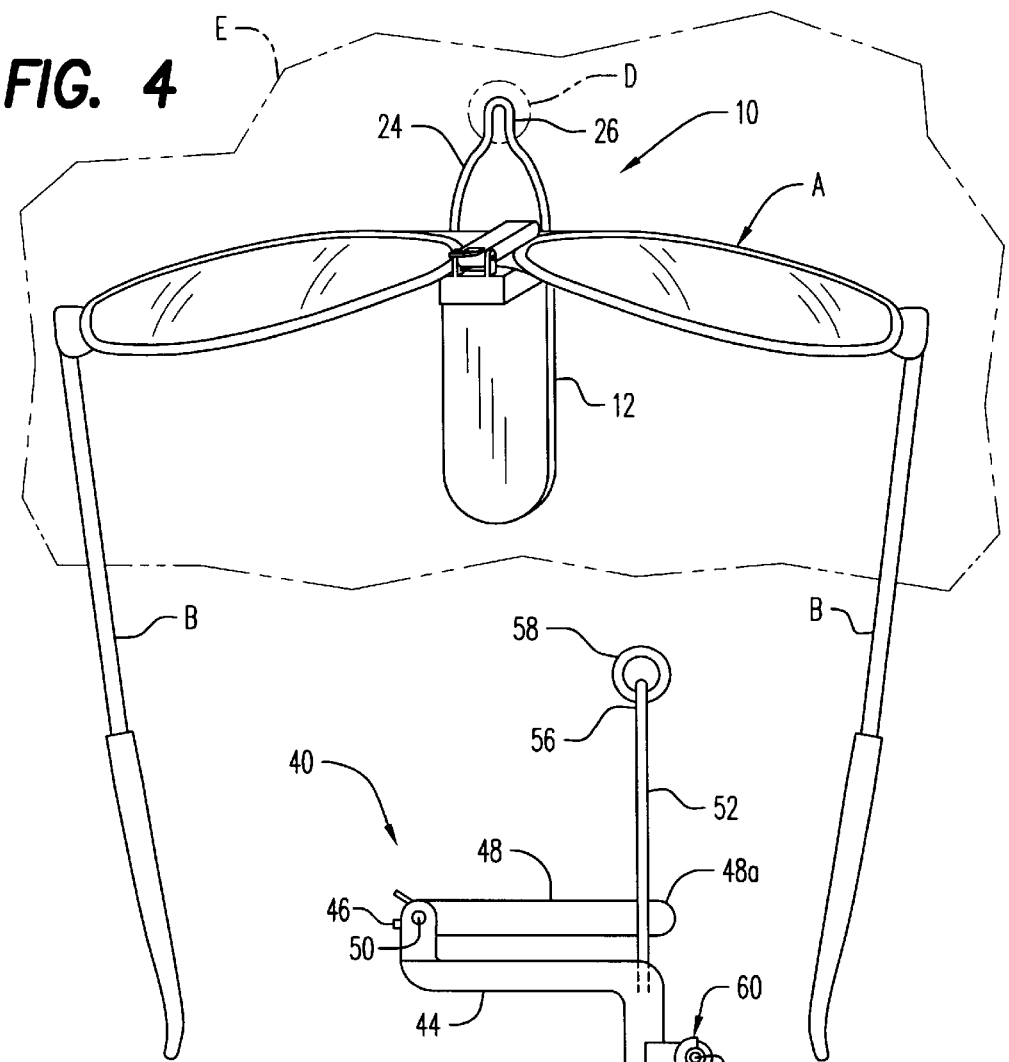
FIG. 4 is a front elevation view of FIG. 1.

Referring now to the drawings, and firstly to FIGS. 1 to 4, one embodiment of the invention is generally shown at numeral 10 and includes an elongated generally flat rigid or semi-rigid plastic upright member 12 and a horizontally disposed plastic lateral member 14 dependently extending generally orthogonally or laterally from an upper portion of upright member 12. When viewed from the side as seen in FIG. 3, the upright member 12 and laterally extending member 14 combine to have the appearance of an inverted "L" shape.

A pair of eyeglasses are shown generally at numeral A and include a central bridge C and pivotally connected temples or side members shown at B. The present invention utilizes the structure of both the bridge C and temples B as described herebelow.

Lateral member 14 is sized in length so that a broad range of bridge sizes shown at C will fit and rest thereatop with the eyeglasses A oriented in an upwardly facing position. In the embodiment 10, the temples B are preferably oriented in an open or extended position so that they are positioned downwardly and receive support from the central torso of the user. An elongated bridge retaining member 22 is pivotally connected about axis 20 to the distal or forward end of the lateral member 14 by a conventional jewelry clip or clasp arrangement 16 such as that found in a conventional pair of earrings. This pivot mechanism 16 includes a biased tab 18 which urges the bridge retaining member 22 in either a horizontal closed position spaced just above the lateral member 14 as shown in phantom in FIG. 3 at 22a or in an upright position shown in solid in FIG. 3. Thus, in addition to providing a pivotal function between the lateral member 14 and the bridge retaining member 22, biased urging toward either the opened or the closed positioning of the bridge retaining member 22 is provided by pivot mechanism 16.

Two means for retaining the device 10 in position with respect to a user's clothing are shown in this embodiment 10. Primary support is received from a button hanger 24 formed as a rigid wire hoop or loop 24 so as to just slip over a button D shown in phantom in FIGS. 2, 3 and 4. This button is typically attached to the front of an article of clothing shown in part at E.

Button hanger 24 may thus easily be positioned over the button D and then slid downwardly therebehind. The stitching holding the button D in position will then slidably engage into a pointed upper portion 26 of the button hanger 24 so as to support the device 10 as shown.

To prevent any substantial side to side or forwardly swinging of the upright member 12, pin 34 of a conventional pendant-style clasp 30, which is connected to the rearwardly surface of upright member 12 by bracket 32, is also provided. The pin 34 is pierced through the article of clothing and then pivoted about axis 38 to a closed position and secured together by locking member 36 as best seen in FIGS. 2 and 3. By this arrangement, the combination of button hanger 24 and pin clasp 30 engagement into the article of clothing E thus fully stabilizes the device 10 and the pair of eyeglasses A connected thereto as shown.

Note that the length of the bridge retaining member 22 is at least as long as that of the lateral member 14 to overlap button hanger 24 so that inadvertent or accidental dislodgment of the bridge C of the eyeglasses A is not possible. Note also that considerable stability is achieved by the inwardly contact of the rearward surface of the upright member 12 against the article of clothing E and the underlying body surface of the user even without the use of pin clasp 30.

An alternate mode for connecting the button hanger 24 is also provided in the form of a slidable ring 28 which may easily be engaged to a necklace or chain worn around the neck of the user in lieu of button engagement as previously described. Note also that, although some resistance to twisting or rotating of the eyeglasses A in the stored position is achieved dependent upon the width of the bridge C, using this embodiment 10 with the temples B in a downwardly extending position greatly enhances the twisting stability of the eyeglasses A when stored thusly.

Figure 5:
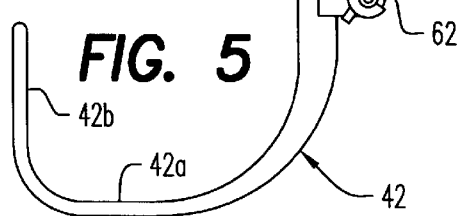
FIG. 5 is a side elevation view of another embodiment of the invention.
Figure 6:
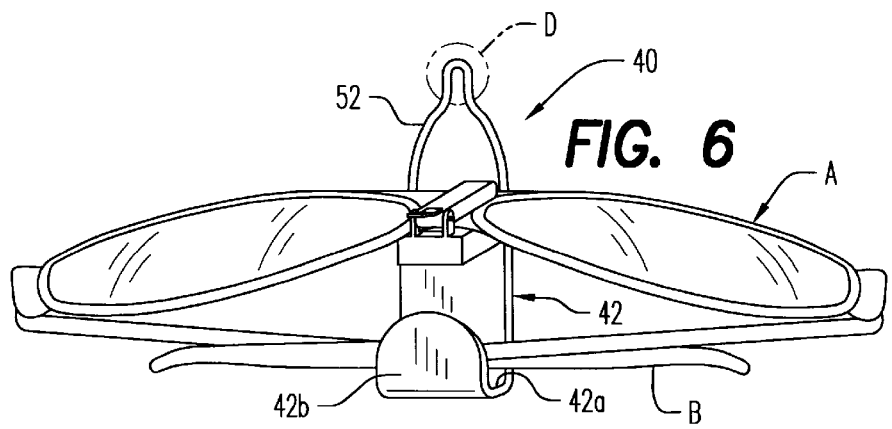
FIG. 6 is a front perspective view of the embodiment of the invention shown in FIG. 5 in use retaining a pair of eyeglasses in the temples closed position.

Referring now to FIGS. 5 and 6, another embodiment of the invention is there shown at 40. This embodiment 40 also includes an upright member 42, a laterally extending member 44, a pivotally connected bridge retaining member 48 which is biasingly urged into either the horizontal in-use position shown or into an upright ready-for-use position by biasing hinge 46 and its pivotal connection 50 as previously described. Note again that the bridge retaining member 48 extends at 48a to at least the wire button hanger 52 as previously described to prevent inadvertent disengagement of the bridge C of the eyeglasses A.

This embodiment 40 also includes button hanger 52 with necklace engaging ring 58 slidably attached thereover, the preferred utilization, however, being achieved by the pointed upper portion 56 for button engagement as previously described. Clasp 60, having a clasp pin 62 connected to the back surface of upright member 42, is also provided.

This embodiment 40 further includes a curved resilient extension or lower portion and upturned distal portion 42a and 42b, respectively, of the upright member 42. This arrangement thus facilitates the preferred mode of eyeglass storage with the temples B in the folded or closed position as shown in FIG. 6. Considerably more eyeglass A stability is achieved by this arrangement wherein the bridge of the eyeglasses is secured between the lateral member 44 and the bridge retaining member 48, while the temples B are secured by the horizontally extending portion 42a and upwardly extending portion 42b of the upright member 42.

Figure 7:
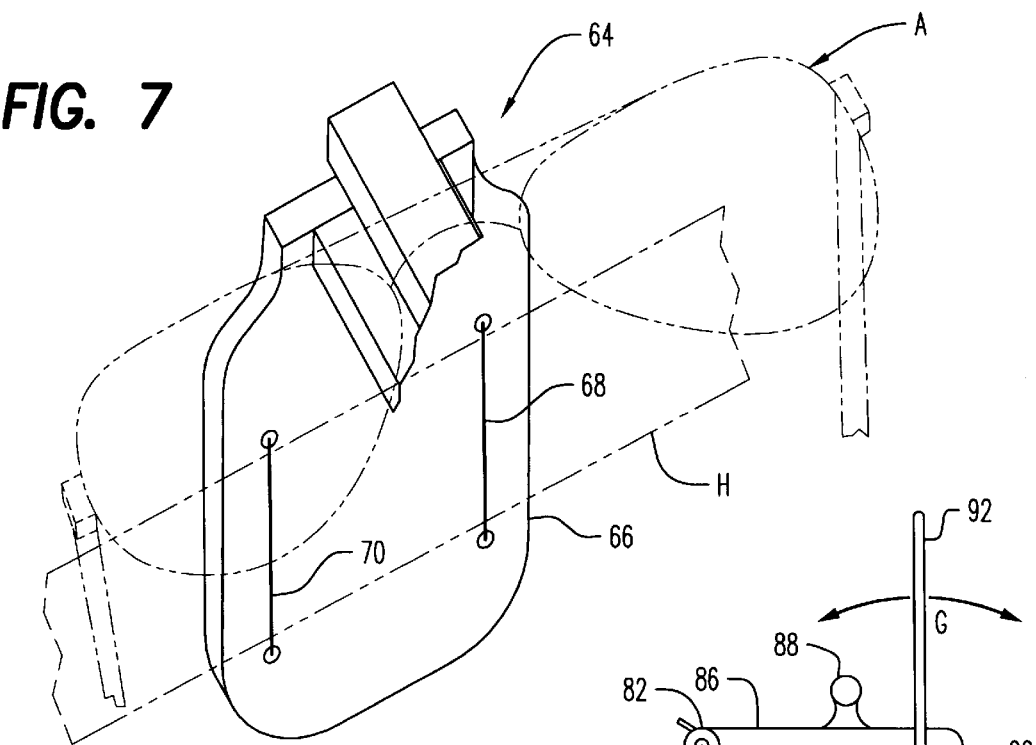
FIG. 7 is a perspective view of still another embodiment of the invention attachable to a waist belt with the eyeglasses shown in phantom.

Several additional embodiments of the invention are shown in FIGS. 7 to 10. In FIG. 7, the upright member 66 of this embodiment 64 is enlarged in length and width and includes spaced slits 68 and 70 which are sized to receive a belt H there through which is worn around the waist of the user. By this arrangement 64 the eyeglasses A may be carried in this body position.

Figure 8:
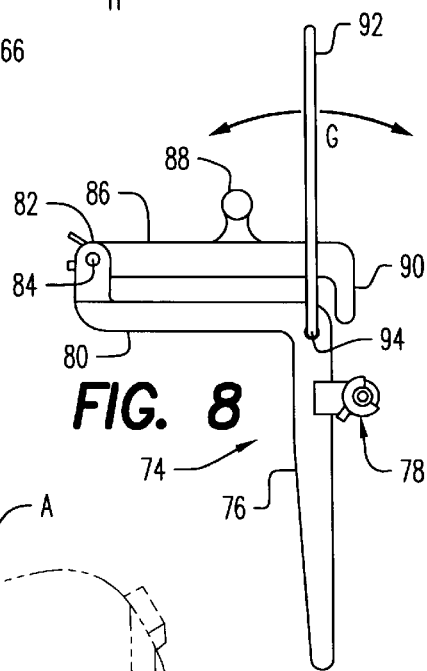
FIG. 8 is a side elevation view of yet another embodiment of the invention.

FIG. 8 discloses several additional features of embodiment 74. Grasping knob 88 is provided which laterally extends from the upper surface of the bridge retaining member 86 when in the in-use horizontal position shown. This greatly facilitates grasping and easy movement for those with any hand or finger impairment. Additionally, this embodiment 74, having the previously described upright member 76 and laterally extending lateral member 80, pivotal member 82, pivotal axis 84 and pin clasp 78, also includes a pivotally connected (rather than rigidly connected) button hanger 92. This button hanger 92 is pivotally connected at 94 so as to allow pivotal movement in the direction of arrow G allowing the button hanger 92 to be pivoted out of the way when not in use.

When the hanging loop 92 is pivoted out of the way, to insure that the bridge C of the eyeglasses A will not inadvertently become disengaged, a hooked portion 90 is formed into the distal edge of the bridge retaining member 86. Thus, the bridge C will be trapped between the bridge retaining member 86 and the lateral member 80 even when the button hanger 92 is not in use.

Figure 9:
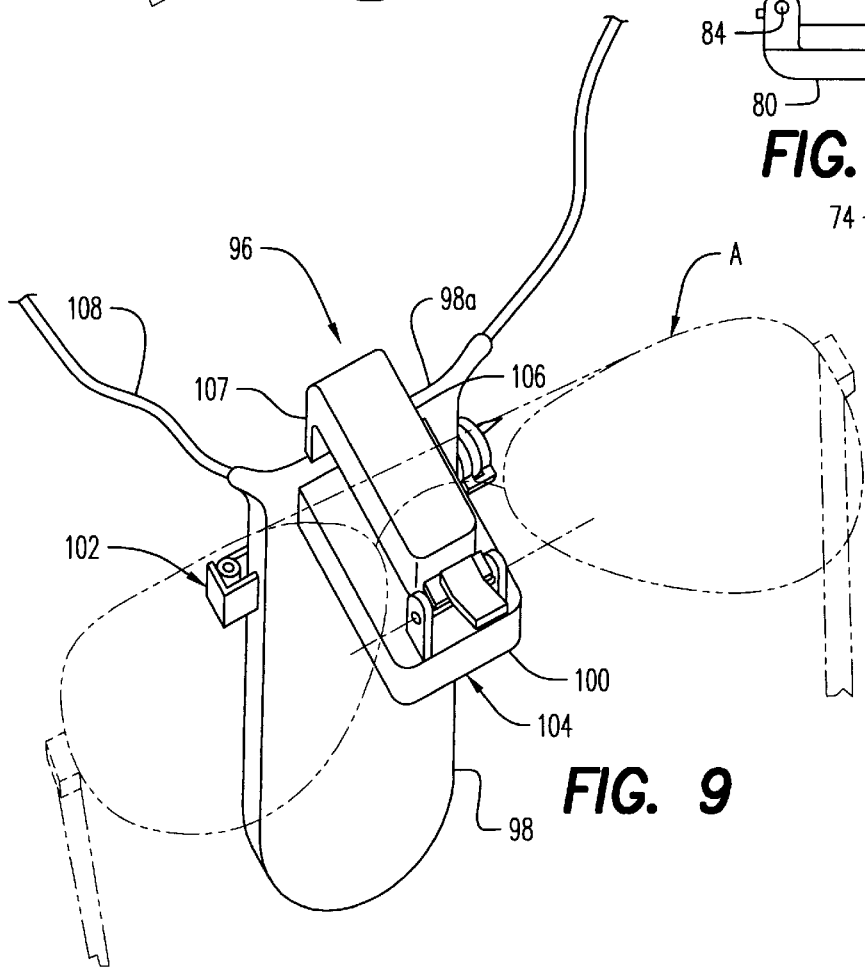
FIG. 9 is a perspective view of still another embodiment of the invention showing the eyeglasses (in the temples open position) in phantom.

The embodiment 96 shown in FIG. 9 adds the feature of a flexible neck strap 108 which is connected at either end thereof to the upper corners of the flat upright member 98. Pin clasp 102, attached to the back side of upright member 98, is also provided for clothing interengagement to prevent side to side or forwardly swinging of the device 96, the weight of which is primarily supported by neck strap 108. Here again, the lateral member 100, connected at one end thereof, and forwardly extending from upright member 98, is pivotally connected by biased hinge 104 to the bridge retaining member 96 and includes a downturned hook portion 107 so as to prevent inadvertent disengagement of the eyeglasses A.

Figure 10:
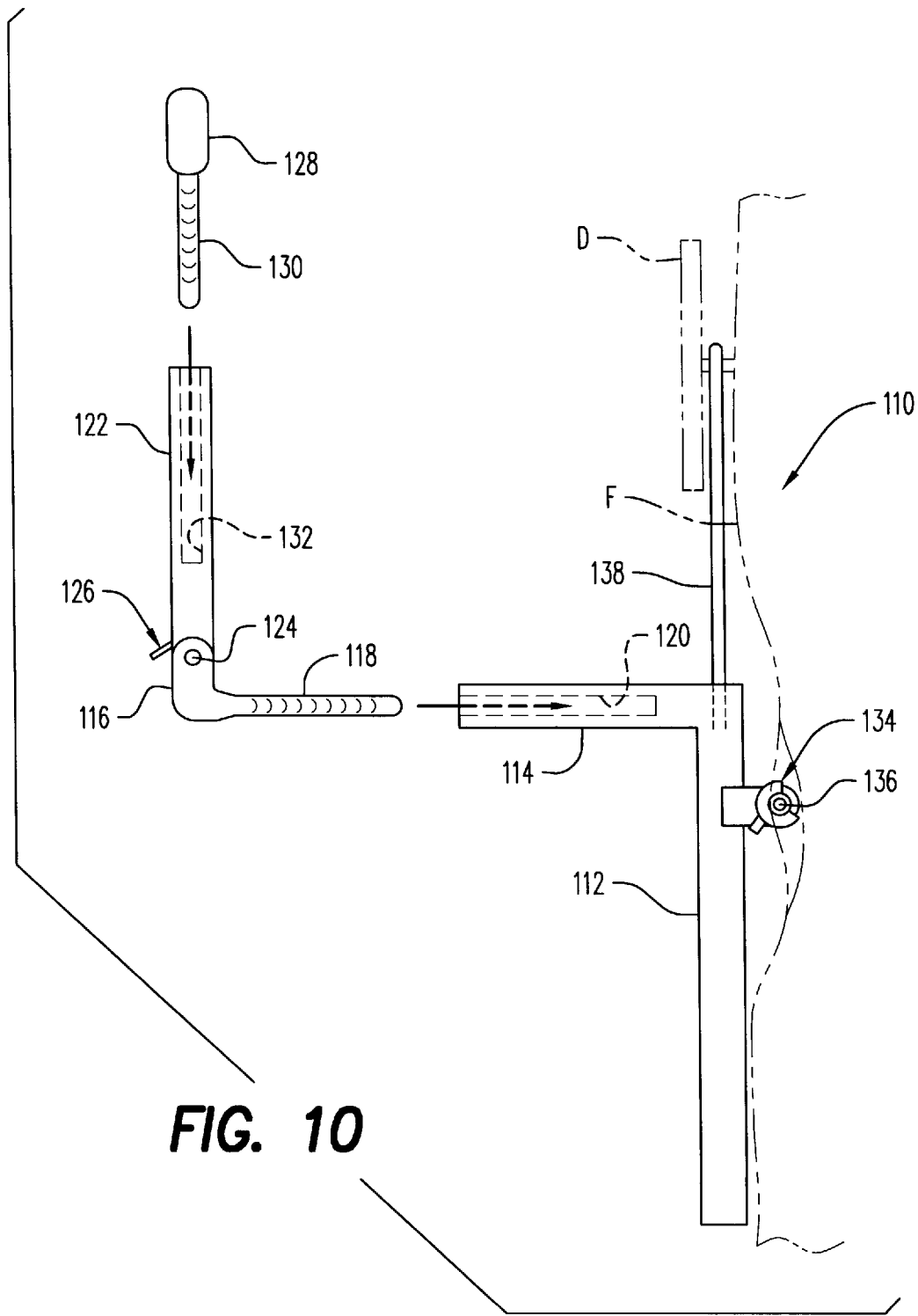
FIG. 10 is a side elevation view of a fully adjustable embodiment of the invention.

Referring lastly to FIG. 10, a fully adjustable embodiment of the invention is shown generally at numeral 110 and includes the upright member 112, laterally extending member 114, wire button hanger 138 supportively engageable over button D, as previously described, and pin clasp 134 which interengages the article of clothing F by pin 136 for lateral and swinging stability as previously described. This embodiment 110 also includes an elongated bridge retaining member 122 which is pivotally connected about axis 124 of biasing clasp 126 to a lateral member extension 116. A tongue extension 118 of the lateral member extension 116 is self-lockingly engageable within cavity 120 in adjustable length fashion. Another extension 128 includes a notched or ribbed tongue 130 which adjustably engages into cavity 132. By this entire arrangement, virtually any size of bridge may be easily accommodated.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An eyeglass holder adapted for securely supporting a pair of eyeglasses having temples and a bridge comprising:

an elongated substantially rigid upright member connected at an upper end thereof to a first end of an elongated substantially rigid lateral member which extends laterally in one direction from said upright member, said lateral member having sufficient length to supportively receive the bridge of the eyeglasses thereatop with the temples facing downwardly;

a pivotal connection between one end of an elongated substantially rigid bridge retaining member and a second end of said lateral member;

biasing means at said pivotal connection for maintaining said bridge retaining member in either an open position upwardly extending from said lateral member or a closed position spaced above and substantially coextensive with said lateral member and defining a bridge receiving and retaining slot therebetween;

retaining means for supportively attaching said eyeglass holder to a user wherein said upright member is held substantially vertically against the user with said lateral member extending substantially horizontally away from the user whereby the bridge of the eyeglasses rests atop said lateral member and is retained thusly by said retaining member when in the closed position.

2. An eyeglass holder as set forth in claim 1, wherein said retaining means includes:

a pin and clasp arrangement connected to said upright member for releasable attachment of said eyeglass holder to an article of clothing being worn by the user.

3. An eyeglass holder as set forth in claim 1, wherein said retaining means includes:

a button engaging member formed of a length of substantially rigid wire generally into a loop which is connected to said upright member, said loop sized to fit over a button of an article of clothing being worn by the user and including a pointed tip formed at an uppermost portion of said loop defining a narrow slot adapted for releasibly securing said loop onto retaining thread which connects the button to the article of clothing.

4. An eyeglass holder as set forth in claim 3, wherein:

said button engaging member includes a ring slidably engaged over said loop for supportive connection of said eyeglass holder to a slender necklace being worn by the user.

5. An eyeglass holder as set forth in claim 1, wherein said retaining means includes:

a pin and clasp arrangement connected to said upright member for releasable attachment of said eyeglass holder to an article of clothing being worn by the user;

a button engaging member formed of a length of substantially rigid wire generally into a loop which is connected to said upright member, said loop sized to fit over a button of an article of clothing being worn by the user and including a pointed tip formed at an uppermost portion of said loop defining a narrow slot adapted for releasibly securing said loop onto retaining thread which connect the button to the article of clothing;

said button engaging member including a ring slidably engaged over said loop for supportive connection of said eyeglass holder to a slender necklace being worn by the user.

6. An eyeglass holder as set forth in claim 1, wherein:

said bridge retaining member includes a hook-shaped distal end which extends beyond and downwardly around an upper end of said upright member whereby the bridge of the eyeglass is fully entrapped from substantially movement when said retaining member is in the closed position.

7. An eyeglass holder as set forth in claim 1, wherein:

a lower end portion of said upright member is shaped to extend in the same lateral direction as, and spaced beneath, said lateral member to form a secondary support for the temples of the eyeglasses whereby the eyeglasses are held on said eyeglass holder in a substantially closed position for better protection thereof.

8. An eyeglass holder as set forth in claim 1, wherein:

said bridge retaining member includes a grasping knob extending upwardly from a central portion of said bridge retaining member when in the closed position.

9. An eyeglass holder as set forth in claim 1, further comprising:

first adjustable extension means for extending the length of said bridge retaining member;

second adjustable extension means for extending the length of said lateral member whereby a broad range of dimensions of bridge width and thickness may be held for storage.

10. An eyeglass holder as set forth in claim 1, wherein:

said upright member includes upright slot means adapted for securing said eyeglass holder onto a waist belt of the user.

11. An eyeglass holder for suspending a pair of eyeglasses from a button sewn onto the front of an article of body apparel, the eyeglasses including a central bridge and pivotally connected temples, said eyeglass holder comprising:

a generally inverted L-shaped member having an elongated upright leg and an elongated lateral leg of sufficient length to supportively receive the bridge of the eyeglasses thereatop;

an elongated bridge retaining member pivotally connected at one end thereof to an otherwise end of the lateral leg whereby said bridge retaining member is pivotable between an open generally upright position and a closed position spaced above and generally coextensive with said lateral leg;

biased means for biasedly maintaining said bridge retaining member in either the open or the closed position;

retaining means for supportively attaching said eyeglass holder to a user wherein said upright member is held substantially vertically against the user with said lateral member extending substantially horizontally away from the user whereby the bridge of the eyeglasses rests atop said lateral member and is retained thusly by said retaining member when in the closed position;

said retaining means including a button engaging member formed of a length of substantially rigid wire generally into a loop which is connected to said upright member, said loop sized to fit over a button of an article of clothing being worn by the user and including a pointed tip formed at an uppermost portion of said loop defining a narrow slot adapted for releasibly securing said loop onto retaining thread which connect the button to the article of clothing.

12. An eyeglass holder as set forth in claim 11, wherein:

said bridge retaining member includes a hook-shaped distal end which extends beyond and downwardly around an upper end of said upright member whereby the bridge of the eyeglass is fully entrapped from substantially movement when said retaining member is in the closed position.

13. An eyeglass holder as set forth in claim 11, wherein:

a lower end portion of said upright member is shaped to extend in the same lateral direction as, and spaced beneath, said lateral member to form a secondary support for the temples of the eyeglasses whereby the eyeglasses are held on said eyeglass holder in a substantially closed position for better protection thereof.

14. An eyeglass holder as set forth in claim 11, wherein:

said bridge retaining member includes a grasping knob extending upwardly from a central portion of said bridge retaining member when in the closed position.

15. An eyeglass holder as set forth in claim 11, further comprising:

first adjustable extension means for extending the length of said bridge retaining member;

second adjustable extension means for extending the length of said lateral member whereby a broad range of dimensions of bridge width and thickness may be accommodated.

16. An eyeglass holder as set forth in claim 11, wherein:

said bridge retaining member includes a hook-shaped distal end which extends beyond and downwardly around an upper end of said upright member whereby the bridge of the eyeglass is fully entrapped from substantially movement when said retaining member is in the closed position;

a lower end portion of said upright member is shaped to extend in the same lateral direction as, and spaced beneath, said lateral member to form a secondary support for the temples of the eyeglasses whereby the eyeglasses are held on said eyeglass holder in a substantially closed position for better protection thereof;

said bridge retaining member includes a grasping knob extending upwardly from a central portion of said bridge retaining member when in the closed position.

* * * * *